Figure 8:
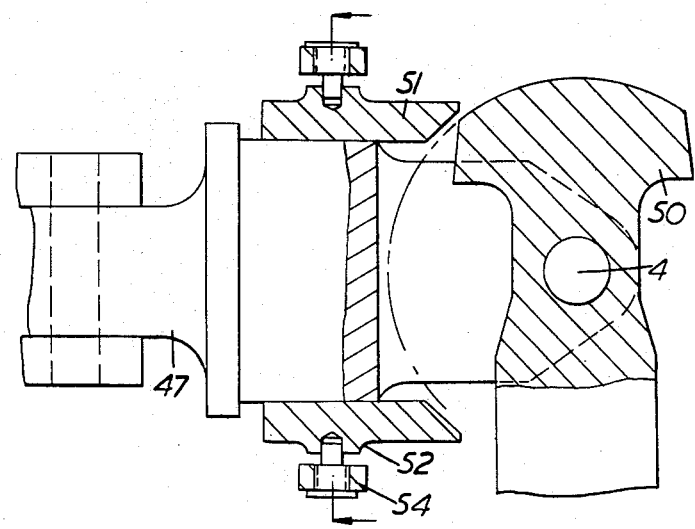

April 26, 1966     A. A. BLYTHE     3,248,073
ROTOR DEVICES FOR ROTORCRAFT
Filed May 1, 1964     7 Sheets-Sheet 1
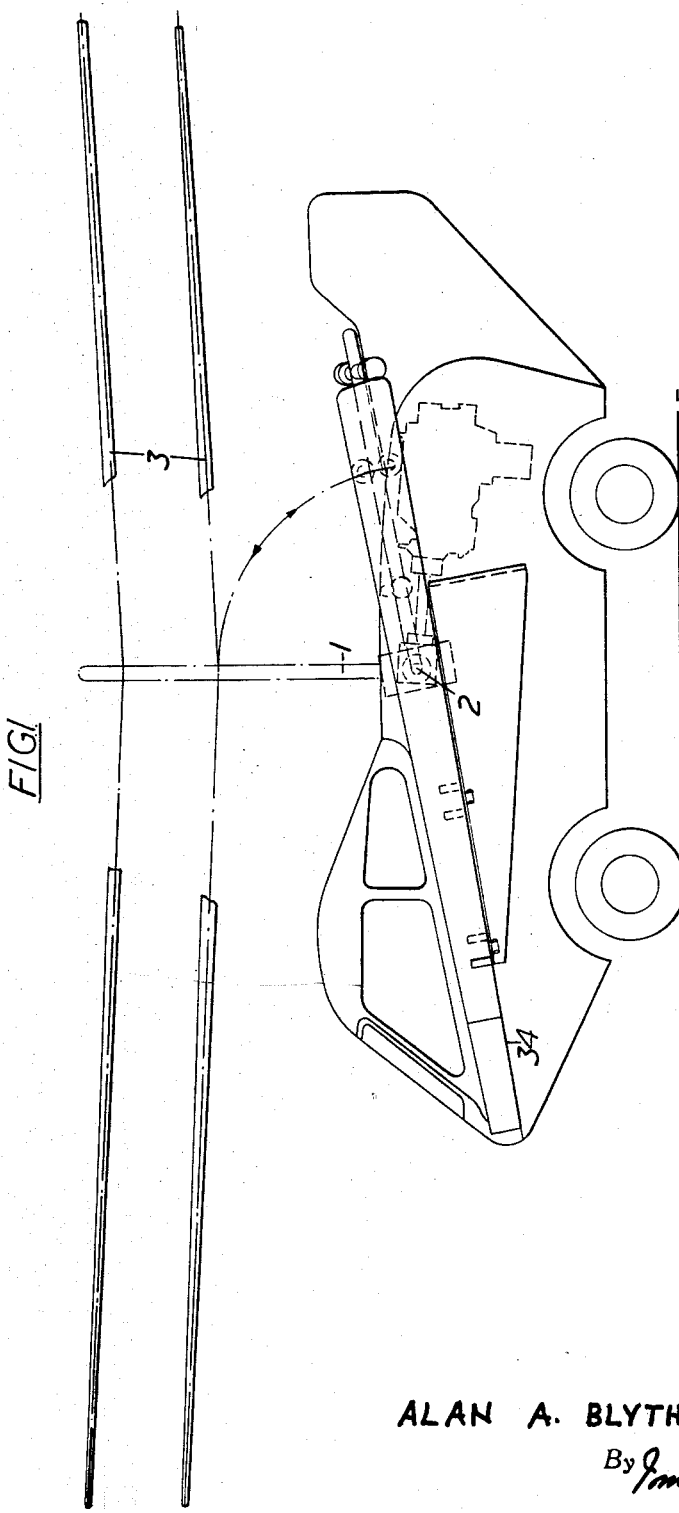
Inventor
ALAN A. BLYTHE
By *Imirie & Smiley*
Attorneys

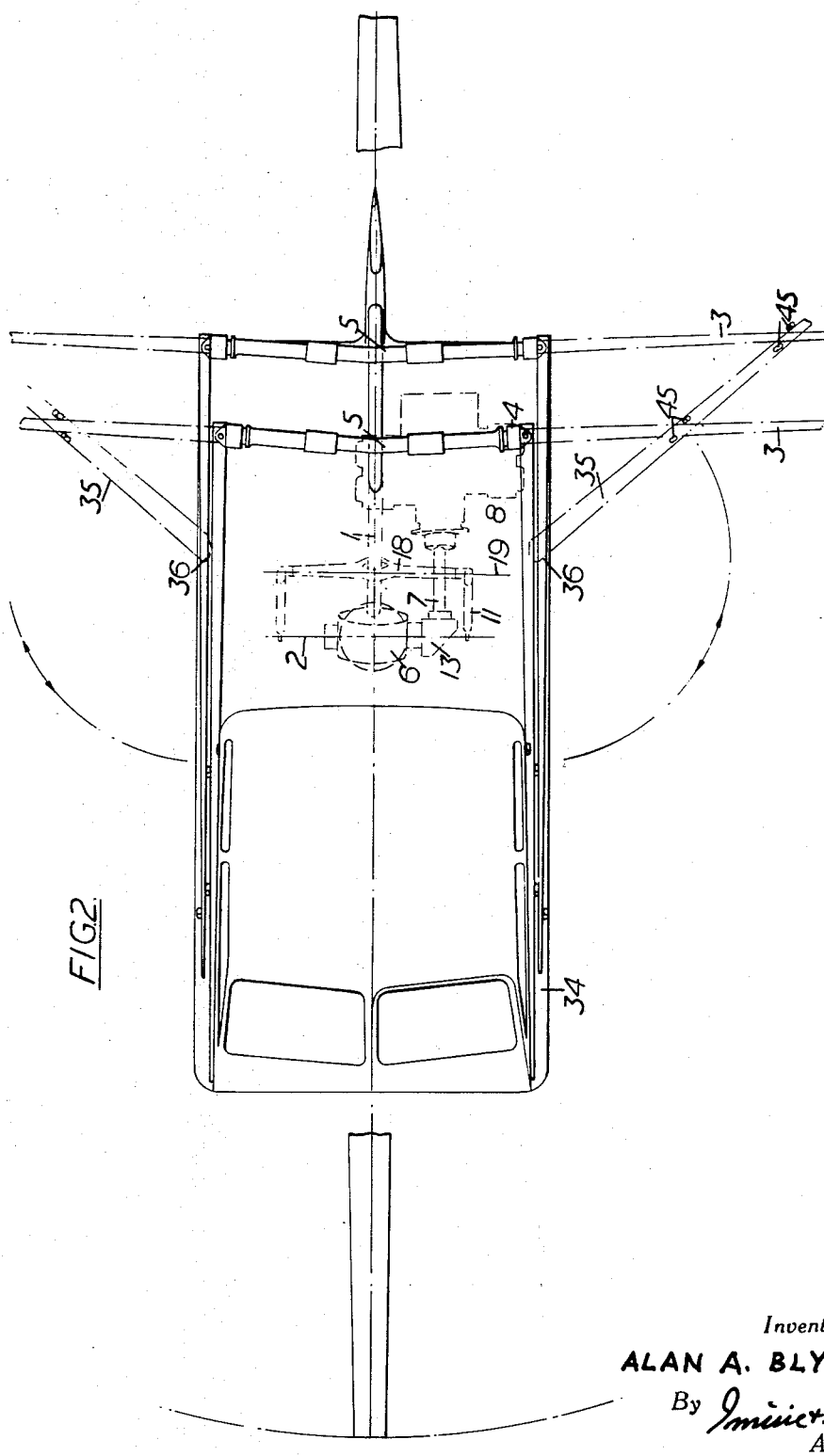

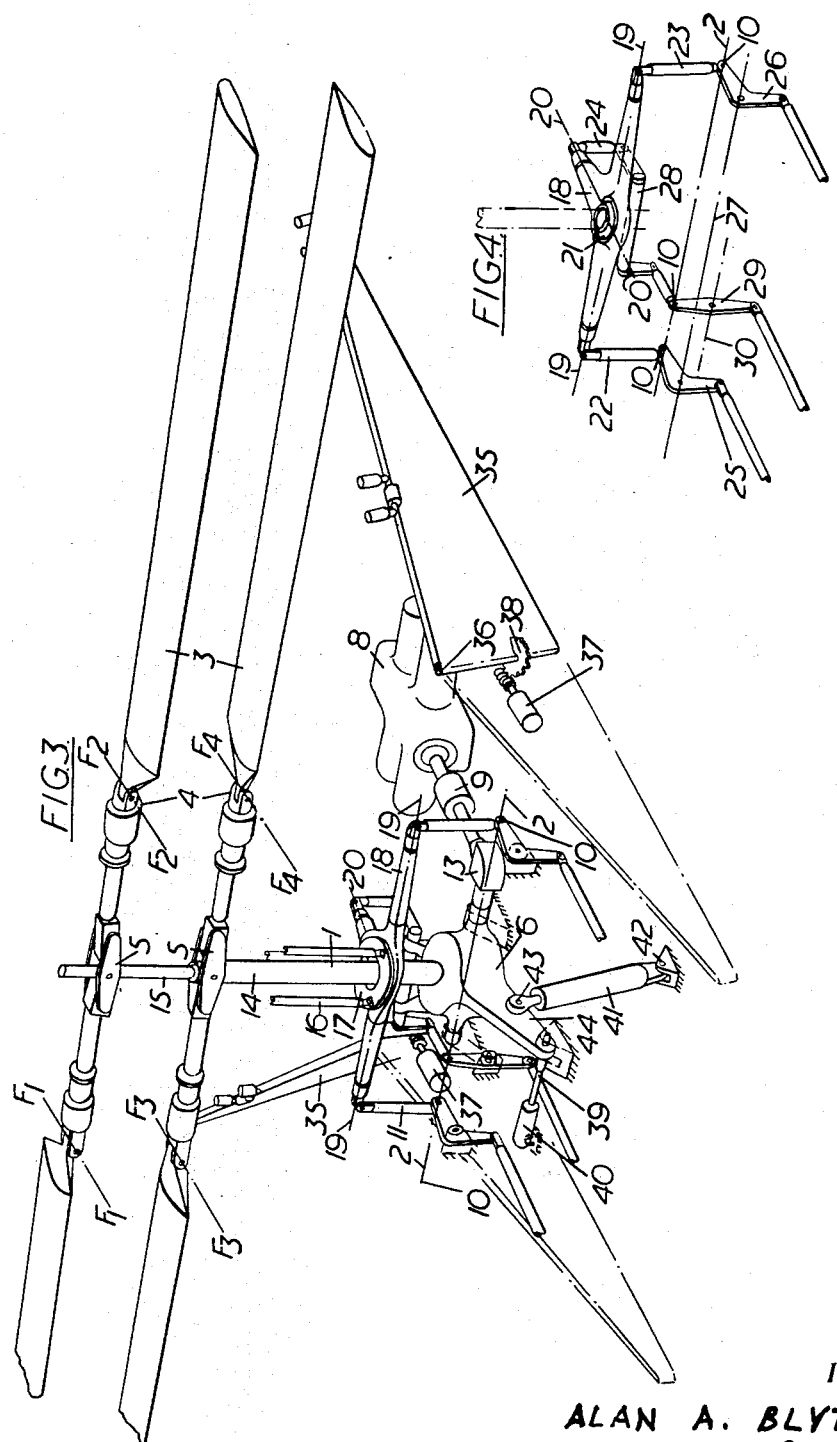

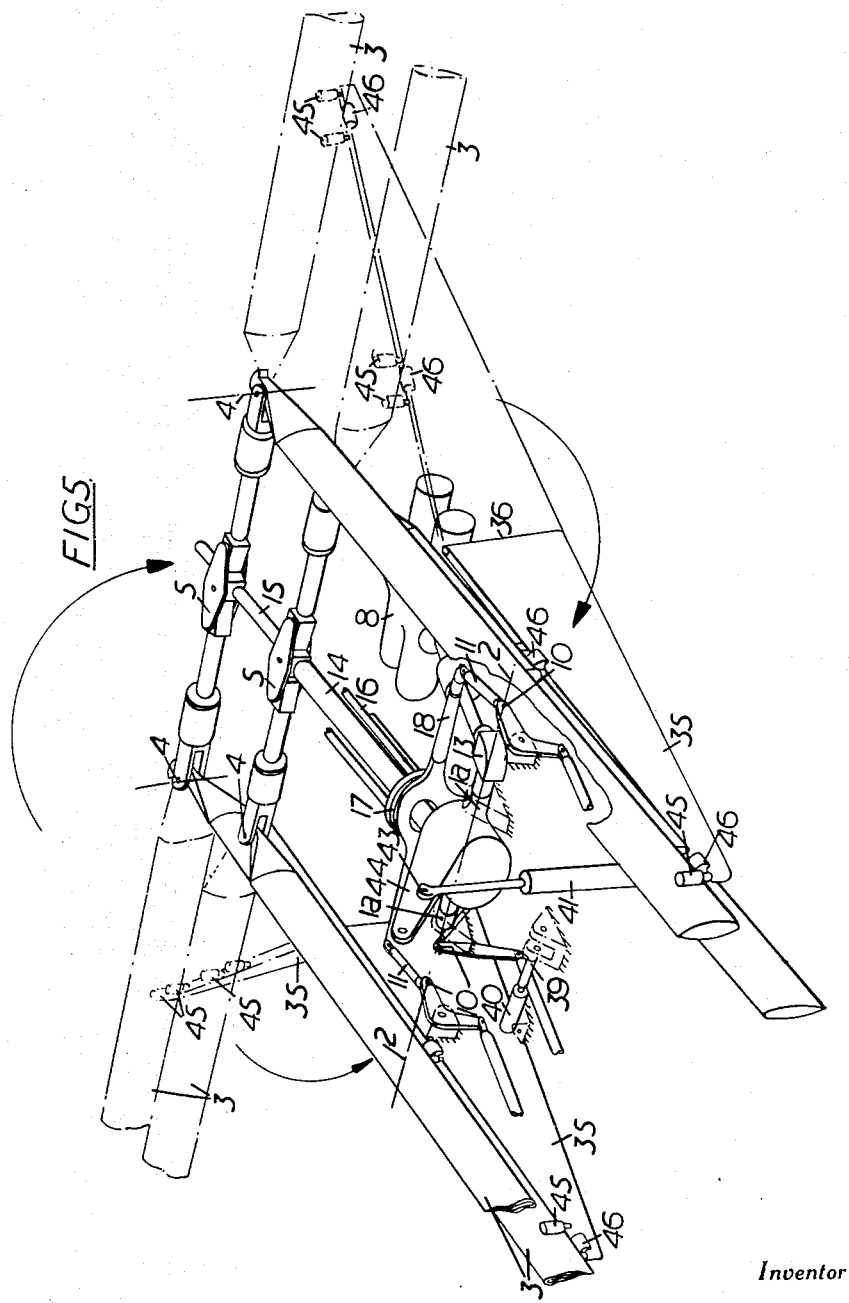

April 26, 1966 A. A. BLYTHE 3,248,073
ROTOR DEVICES FOR ROTORCRAFT
Filed May 1, 1964 7 Sheets-Sheet 5
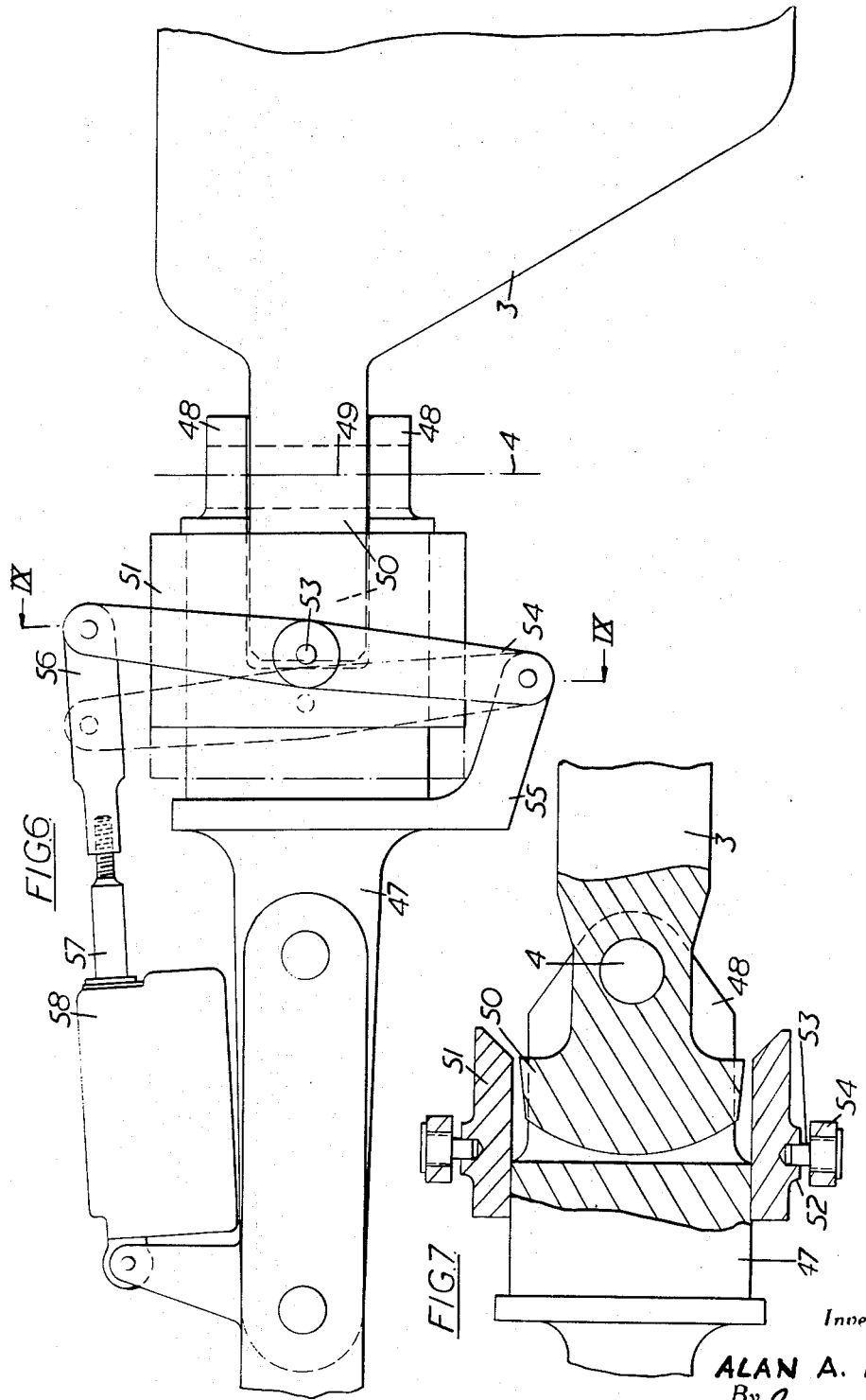
Inventor
ALAN A. BLYTHE
By
Attorneys April 26, 1966  A. A. BLYTHE  3,248,073
ROTOR DEVICES FOR ROTORCRAFT Filed May 1, 1964  7 Sheets-Sheet 7

Inventor
ALAN A. BLYTHE
By *Imrie & Smiley*
Attorneys

United States Patent Office 3,248,073
Patented Apr. 26, 1966

3,248,073
ROTOR DEVICES FOR ROTORCRAFT
Alan Avery Blythe, St. Albans, England, assignor to Handley Page Limited, London, England, a company of Great Britain
Filed May 1, 1964, Ser. No. 364,116
Claims priority, application Great Britain, May 3, 1963, 17,680/63
17 Claims. (Cl. 244—17.11)

This invention relates to rotor devices for rotorcraft vehicles including helicopters and autogyros as well as land and water craft equipped with rotor systems, and more particularly to folding devices to permit the rotor blades to be stowed out of the operating position.

It is known for helicopter or autogyro rotors to be constructed so that the blades may be swung around their drag hinges until they lie alongside one another and above the body of the vehicle, thereby reducing the overall width of the vehicle and generally effecting some reduction in the overall length of the vehicle. In the folded position, however, the blades still project for a distance, equal to approximately half the total rotor diameter, behind the rotor hub, which, in the case of a vehicle with a single rotor or two co-axial rotors, must be located close to the centre of gravity of the vehicle. They may therefore extend beyond the one end, e.g. the rear end, of the vehicle body. This is especially so in the case of autogyro vehicles or helicopters with co-axial counter-rotating rotors and no tail rotor because such vehicles can have short bodies.

In known folding rotor blade construction overall height with the blades folded is virtually not reduced, and the folded rotor blades overhang beyond either end of the vehicle body, both of which are important especially where the vehicles are stowed in confined spaces as on board ship for example or in a garage.

The main object of the present invention is to provide a rotor folding device which overcomes these disadvantages and which can also be controlled from the vehicle cockpit or pilot's seat without a break in the power transmission system to the rotors other than at a clutch required in any case when starting the rotors and without any breaks in the rotor control system.

According to the present invention a folding device for a rotorcraft comprises a rotor mast rotatably disposed in a pivotable frame for mounting in the craft with a driving connection to at least one prime mover in the craft, a number of rotor blades mounted on the mast each preferably having an outer portion hinged to the inner portion, a device for pivoting the mast with respect to the frame from a vertical operating position to a lowered stowing position, a locking device to secure the mast in the vertical and lowered positions, and stowing devices operable to engage the outer blade portions and fold them about their hinges into a stowing position e.g. alongside the craft.

In a preferred construction the drive to the mast is from the rotor prime mover of the craft and includes a clutch and is constructed to permit the mast to be pivoted from the operating to the stowing position without interrupting the rotor drive other than by disengaging the clutch. The mast is preferably driven through a gear box the input shaft of which is coaxial with the mast pivot, the gear box being disposed within the pivotable mast frame. The device for pivoting the mast frame with respect to its mounting in the vehicle may be a hydraulically operated device such as a cylinder connected between the frame and the frame mounting on the vehicle, or may be electrically or pneumatically operated.

Each blade stowing device preferably comprises an arm hinged to the vehicle so as to swing from a stowing position preferably alongside the vehicle to an extended position, and one or more members on the arm engageable with the blade or blades in the extended position to move the outer blade portion into the stowing position when the arm is moved to its stowing position, means being provided to unlock the blade hinges to permit the movement of the outer portions thereof.

The sets of rotors may be provided to rotate coaxially in the operating position, the mast having concentric drive shafts each connected to one of said rotors, means being provided including connections to control devices through a linkage having pivots coaxial with the mast frame pivot, whereby the mast may be raised or lowered without disconnecting said linkage.

The preferred device for pivoting the mast and the outer blade portions and for operating the stowing devices, as well as the clutch, and blade hinge locking devices when provided, are all power driven and control means are provided adapted to be located within reach of the pilot's seat and operable to cause actuation of said actuating devices and clutch in a predetermined sequence to prevent damage to the rotor device during the movement to and from the stowing position.

Mechanism may be provided to stop the rotor or rotors in the correct rotational position for folding, as well as a manually operable selector, a sequencing device responsive to the selector and controlling the actuating devices to spread and erect the rotor device or to fold the rotor device.

The invention also includes a craft having rotor blades and incorporating a rotor device of the invention.

Figure 9:
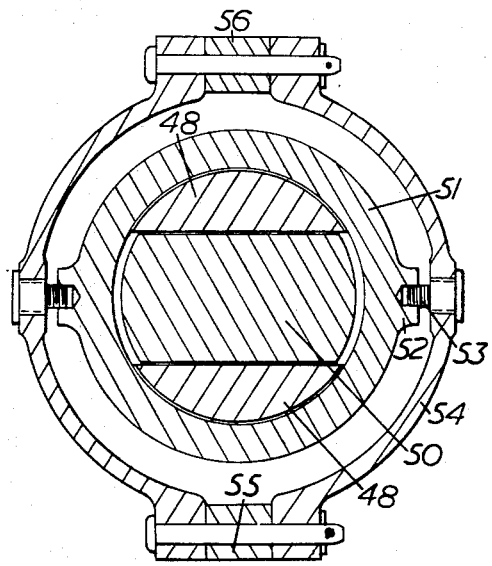
Figure 10:
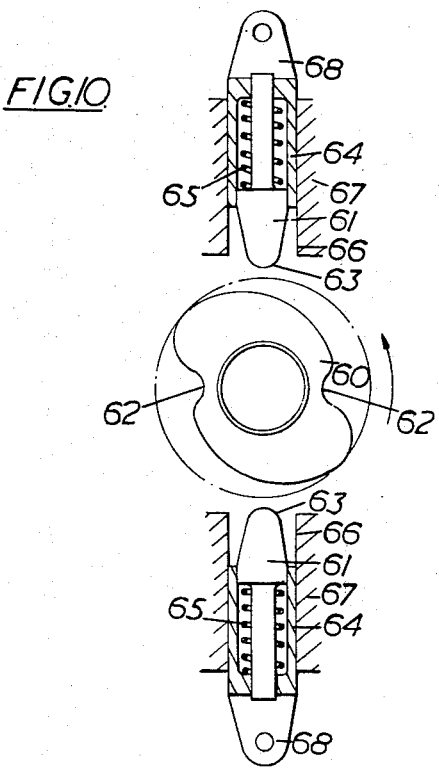
Figure 11:
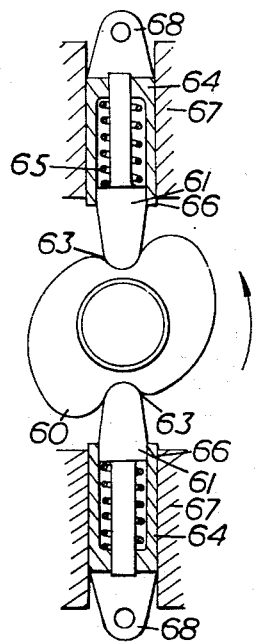

In order that the invention may be more clearly understood one embodiment in accordance therewith will now be described, by way of example, with reference to the accompanying drawings, in which:

FIG. 1 is a side elevation of a rotorcraft vehicle having a folding rotor device, FIG. 2 is a plan view of the vehicle shown in FIG. 1, FIG. 3 is a perspective view of the rotor device in the erected or flying or operating position, the means for stowing the rotor blades being shown in position ready for the stowing operation, FIG. 4 is a detailed perspective view of the control system of the rotor blades in the region of the folding axis, FIG. 5 is a view similar to FIG. 3 showing the rotor mast in the retracted position, the rotor blades still extended being shown in chain-dotted lines while the full lines show the blades folded along the sides of the vehicle, FIG. 6 is a detailed elevation of the device for disengaging the rotor blades hinges, FIG. 7 is a partial cross section of FIG. 6 showing the extended blade locked in position, FIG. 8 is a cross section similar to FIG. 7 showing the blade hinge unlocked, FIG. 9 is a cross section on the line IX—IX of FIG. 6 looking in the direction of the arrows, and FIGS. 10 and 11 are detailed views of a cam device for stopping the rotor blades in the position for showing, FIG. 10 showing the inoperative and FIG. 11 the operative position of the device.

In the drawings the same references are used to designate the same parts.

Referring to the drawings these show a rotorcraft such as a helicopter, but the rotor device can be used with any land, water or air borne craft incorporating a rotor device, rotor blade flapping hinges being situated at a radius from the rotor axis approximately equal to half the vehicle body width. The rotor mast 1 is supported in a frame 1a which pivots about a transverse axis 2 and the rotor blades 3 about chordwise hinges 4, which may also be flapping hinges, so that the rotor hubs 5 are lowered and moved towards one end of the body, in this case the rear end, and the rotor blades 3 are moved to lie approximately along the length of the body with their tips nearest to the end of the body most remote from the hub, in this case the front end. Two rotors each having two blades 3 are shown shaft driven from a gear box 6 situated at the lower end of the mast 1 and the driving shaft 7 from the engine 8 to the rotors is arranged so that it enters the gearbox along the folding axis 2 of the mast. A clutch 9, FIG. 3, between the engine and the gearbox is disengaged before folding and enables the gears in the gearbox to rotate freely as the mast is folded. Pin joints 10 in each of the control runs operating the rotor blade pitch change mechanism 11 are arranged so that they are aligned with the folding axis 2 of the rotor mast 1 when the flying control stick (not shown) is located in the stowed position and the collective pitch means (not shown) is located in the stowed position. In this way, it is not necessary to break the power transmission system other than at the clutch 9 or to break the control system in order to stow the rotors.

Referring to FIG. 3, the drive-shaft 7 from the prime mover 8 shown as the flight engine passes through the clutch 9 into a bevel box 13 which changes the direction of the drive-shaft so that its axis lies along the axis 2. The drive then passes into the gearbox 6 where it drives two vertical co-axial contra-rotating shafts 14 and 15 which rotate the pairs of rotor blades 3 in opposite directions.

Three vertical push-pull rods 16 are mounted on a swash-plate 17 and the whole assembly rotates with the outer drive shaft 14. The swash-plate 17 is supported by a spider 18, which does not rotate but is free to move in a vertical direction and to tilt about axes 19 and 20 FIG. 3. The swash-plate 17 and rods 16 form the lower part of the conventional cyclic pitch control of a rotorcraft for varying the pitch of the blades, but they form no part of the present invention; the rotor drive of this invention may be applied by a rotorcraft having such rotor pitch control devices and they are shown to indicate one form of inter-relation of such devices and the foldable rotor device of this invention.

The spider 18 (FIG. 4) is located by a universally mounted sleeve 21 around the drive-shaft 14 and is supported by three more vertical push-pull rods 22, 23, 24. Rods 22 and 23 are operated directly by bell-cranks 25 and 26 rotating about axis 27 and rod 24 is operated through a torque tube 28 with cranks from a lever 29, rotating about axis 30.

To produce a collective pitch change at the rotors, all three rods 22–24 are operated together and move the spider 18 vertically up or down the shaft 14. For cyclic pitch control in the roll sense, rods 22 and 23 are operated differentially about fore and aft axis 20 and for cyclic pitch control in the fore and aft direction, rod 24 only is operated which tilts the spider 18 about transverse axis 19.

Before folding the rotor mast, the flying control stick and the collective pitch lever are put into the stowed position. This action brings the levers 25, 26, and 29 up against adjustable stops which locate joints 10 on the folding axis 2.

After landing, the flight engine speed is reduced to idling speed. The flight engine 8 is then uncoupled from the rotor device by disengaging the clutch 9. A cam device (FIGS. 10 and 11) ensures that the rotors are brought to rest with the blades in the correct position for folding. The cam device consists of a cam 60 mounted on either shaft 14 or shaft 15 preferably 14 and a spring loaded plunger or plungers 61 with a damper device. Preferably the cam 60 is fixed to the shaft 14 just above the circular housing of the gearbox 6 and has two hollows 62 one for each plunger 61; the plungers 61 have rounded nose pieces 63 (which may carry cam engaging rollers), to engage smoothly into the hollows 62, and are slidably mounted in plunger cylinders 64, springs 65 being provided to urge the nose pieces towards the cam; the cylinders 64 slide in bores 66 in fixed members 67 forming part of or mounted on the said housing, the cylinders having portions 68 to which may be articulated a governor responsive to the speed of the blades so that as the blades slow down the governor moves the cylinders 64 towards the cam 60 thereby avoiding sudden engagement of the nose pieces with the cam which would create undesirable shocks. By fixing the cam 60 to rotate with the shaft 14, slowing of the shaft 14 will, through the differential gears of the gearwork 6, also slow the shaft 15, the nose pieces finally bringing the rotors to rest transversely of the vehicle with the nose pieces in the hollows 62. The governor is arranged so that it prevents contact between the plunger nose 63 and the cam 60 except at speeds below idling speeds. A mechanical override is preferably provided on the clutch 9 to ensure that it cannot be engaged when the rotors are folded.

Referring to FIGS. 2 and 3 two stowing devices in the form of two swinging arms 35 which are pivoted at 36 on the sides of the vehicle, are provided which can be swung outwards to a predetermined position by rotary actuators 37 driving worm and pinion gears 38 situated on their pivoting axes.

The mast frame 1a pivots in the vehicle frame and is locked in the vertical, i.e. operating position by a locking pin 39 operated by a jack 40 actuated in any suitable manner, e.g. hydraulically or electrically. The mast frame is pivoted between the vertical and stowing positions by a jack 41, which may be hydraulically or electrically operated, having its cylinder fixed to the vehicle frame at 42 with its extensible arm pivoted at 43 to the arm 44 of the mast frame. When the mast 1 is lowered with the rotor blades extended, the outer portion of the blades rest between rollers 45 and on rollers 46 on the arms 35. Since the axes 36 of the swinging arms 35 are offset from the hinges 4 of the rotors, the outer blade portions are retained and automatically gripped by the rollers 45 when they have been swung alongside the vehicle into the recesses 34 by swinging the arms 35 into the stowing position.

The blade hinges 4 are disposed so that in the lowered mast position they lie generally in line with the sides of the vehicle, which has recessed portions 46 to accommodate the outer portions of the blades when folded. The blade hinges 4 are shown in detail in FIGS. 6 to 9 in which the inner portions 47 of the blades have forked ends 48 between the arms of which the outer blade portions 3 are rotatably mounted on pins 49. The inboard end of the portion 3 of each blade has a shaped portion 50 and a locking sleeve 51 is slidably mounted on the outer ends of the portions 47 to be slid outwards, to lock the outer blade portions in the flying position, and inwards to unlock the portions 3 so that they can be hinged to the stowing position by the arms 35. The sleeve 51 has trunnions 52 with pins 53 extending through a ring 54 pivoted to an arm 55 on the portion 47 and operable by a link 56 pivoted thereto and connected to the actuating element 57 of a jack 58 or like device mounted on the portion 47. The jack 58 may be hydraulically, electrically or pneumatically operated.

The correct sequence of operations which is ensured by a conventional form of interlocked devices initiated by the pilot actuating a control switch, lever or like device from the flying to the stowing position, is as follows. Having landed, the pilot throttles back the engine 8 and the rotors slow down to idling speed, the clutch 9 is disengaged and the cam device halts the rotors with the blades extending sideways of the vehicle; the arms 35 are swung out (as in FIG. 5) by the actuators 37, the jack 40 unlocks the locking pin 39, the jack 41 is actuated to lower the mast 1 so that the blade portions rest on the rollers 46 and between rollers 45, the actuators 58 are operated to withdraw locking sleeves 51, the actuators 37 swing the arms 35 to move the blade portions 3 into the recesses 34, and a signal indicates to the pilot that the stowing is complete. The vehicle can then be driven over land by its prime mover which can be the engine 8.

To prepare for flight, the operations are reversed. Actuators 37 are operated, opening the swinging arms 35 to extend the blade portions 3. The blade retaining sleeves 51 are then extended to engage with the stub ends 50 of the blade portions 3 and support the blades and when all the actuators 58 have completed this operation an electrical signal permits the jack 41 to erect the rotor mast 1. When jack 41 has completed its travel a sequence valve operates the jack 40 which engages pin 39 to lock the mast by forming the third structural connection between the rotor mast and the vehicle body. The mechanical over-ride on the clutch 9 cannot be released until this structural connection has been made. The swinging arms 35 are then returned to the sides of the vehicle and the vehicle is ready for flight.

In an alternative construction a second or more prime movers may be employed and in this case a second drive such as shown at 7, 13, FIG. 2, may be used on the opposite side of the gearbox 6, but in that case if need be a free wheel or like device would be incorporated in the drive to permit one engine to run or drive faster than the other.

While the rotor device of the invention has been described with reference to a helicopter it may be used with any rotor craft such as an autogyro, or any land or water vehicle with rotors.

I claim:

1. A rotor device for a rotorcraft comprising a pivotal frame mountable in the craft, a rotor mast rotatably disposed in said frame, a driving connection between said mast and at least one prime mover in said craft, a number of rotor blades mounted on said mast, each said blade preferably having an outer portion hinged to the inner portion thereof, a power operated device operable to pivot said frame and mast from a vertical operative position to a lowered stowed position, and power operated stowing devices operable to engage each said outer blade portion and fold it about said hinge into a stowing position alongside said craft.

2. A rotor device according to claim 1 wherein the drive to the mast from the prime mover includes a clutch and is constructed to permit the mast to be pivoted from the operating to the stowing position without interrupting the rotor drive other than by disengaging the clutch.

3. A rotor device according to claim 2 wherein the mast is driven through a gear box the input shaft of which is coaxial with the mast pivot, the gear box being disposed within the pivotable mast frame.

4. A rotor device for a rotorcraft comprising a pivotable frame mountable in the craft, a rotor mast rotatably disposed in said frame, a driving connection between said mast and at least one prime mover in said craft, a number of rotor blades mounted on said mast, each said blade having an outer portion hinged to the inner portion thereof, a power operated device connected between said frame and a member fixed with respect to said craft and operable to pivot said mast with respect to said frame from a vertical operative position to a lowered stowed position, a power operated locking device to secure said mast in said positions, and power operated stowing devices operable to engage each said outer blade portion and fold it about said hinge into a stowing position alongside said craft.

5. A rotor device for a rotorcraft according to claim 4 wherein each said power operated stowing device comprises, an arm hinged to said craft to swing from a stowing position substantially alongside said craft to an extended position, at least one member on said arm engageable with at least one of said blades in the extended position to move said outer blade portion to said stowing position with said arm, and power means operable to swing said arm from its stowing to its extended position and back.

6. A rotor device according to claim 5 wherein the hinges between the inner and outer blade portions form flapping hinges of the blades.

7. A rotor device according to claim 5 wherein the blade hinges include locking devices for retaining the outer portions of the blades aligned with the inner portions and releasable to permit folding of the outer portions, said locking devices having operating means actuated from a remote control device adapted to be located within reach of the vehicle pilot's seat.

8. A rotor device according to claim 7 wherein said power operated mast pivoting device, said power operated stowing devices, and said power operated blade hinge locking devices are provided with control means adapted to be located within reach of the pilot's seat and operable to cause actuation of said devices in a predetermined sequence to prevent damage to the rotor mast and blades during the movement to and from the stowing position.

9. A rotor device according to claim 5 wherein sets of rotors are provided coaxially rotatable in the operative position, the mast having concentric drive shafts each connected to one of said rotors, means being provided including connections to control devices through a linkage having pivots coaxial with the mast frame pivot, whereby the mast may be raised or lowered without disconnecting said linkage.

10. A rotor device according to claim 5 wherein a mechanism is provided to stop the rotor in the correct rotational position for folding, as well as a manually operable selector, and a sequencing device responsive to the selector and controlling said power operated devices to spread and erect the rotor device or to fold the rotor device.

11. A rotor device for a rotorcraft comprising a pivotable frame mountable in the craft, a rotor mast rotatably disposed in said frame, a driving connection including a clutch and a gearbox between said mast and at least one prime mover in said craft, a number of rotor blades mounted on said mast, each said blade preferably having an outer portion hinged to the inner portion thereof, a power operated device operable to pivot said mast with respect to said frame from a vertical operative position to a lowered stowed position, a power operated locking device to secure said mast in said positions, and stowing devices operable to engage each said outer blade portion and fold it about said hinge at a stowing position alongside said craft, the mast having concentric drive shafts each connected to one of said rotors, means being provided including connections to control devices for said power operated devices through a linkage having pivots coaxial with the mast frame pivot, whereby the mast may be raised or lowered without disconnecting said linkage.

12. A rotor device according to claim 11 wherein a swash-plate having a number of push-pull rods is mounted to rotate with the outer drive shaft and is supported by a non-rotatable spider free to move vertically and to hinge about two mutually perpendicular axes.

13. A rotor device according to claim 11 wherein a mechanical over-ride device is provided on the clutch to ensure that the clutch cannot be engaged when the rotors are out of the operable position.

14. A rotor device according to claim 11 wherein two or more prime movers are provided with a separate drive from each to the gearbox, a freewheel device being provided to permit one prime mover to drive faster than the other.

15. A rotor device according to claim 10 wherein said mechanism to stop the rotor in correct position for folding comprises a cam secured to the rotor mast and having a locking recess, a locking plunger, and power operated means for moving the plunger toward and away from said recess.

16. A rotor device according to claim 15 wherein means is further provided for preventing operation of said power operated means to move said plunger into the locking recess except at speeds of the rotor mast prime mover below idling speeds.

17. A rotor device according to claim 1 wherein the inner portion of each blade is forked, the outer portion of each blade being hinged on a pin extending between the tines of said fork and having its inner end swingable between said tines, a sleeve slideable along said forked part of the blade inner portion to cover and uncover said swingable inner end of the outer blade for respectively locking the inner and outer blade portions in alignment and unlocking said portions for folding, and automatic means for moving said sleeve.

References Cited by the Examiner

UNITED STATES PATENTS

| | | | |
|---|---|---|---|
| 2,487,020 | 11/1949 | Gilcrease | 244—17.11 |
| 2,534,062 | 12/1950 | Roman | 244—6 |
| 3,112,088 | 11/1963 | Speechley | 244—2 |
| 3,116,896 | 1/1964 | Sigler et al. | 244—2 |
| 3,133,715 | 5/1964 | Grunfelder | 244—17.11 |

MILTON BUCHLER, *Primary Examiner.*

L. C. HALL, *Assistant Examiner.*